US011859996B2

(12) United States Patent
Choi

(10) Patent No.: US 11,859,996 B2
(45) Date of Patent: Jan. 2, 2024

(54) APPARATUS FOR SUGGESTING STOPPING BY FACILITIES AND AUTONOMOUS VEHICLE INCLUDING THE SAME

(71) Applicants: HYUNDAI MOTOR COMPANY, Seoul (KR); KIA CORPORATION, Seoul (KR)

(72) Inventor: Yeon Hee Choi, Yangsan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 75 days.

(21) Appl. No.: 17/325,698

(22) Filed: May 20, 2021

(65) Prior Publication Data

US 2022/0090935 A1    Mar. 24, 2022

(30) Foreign Application Priority Data

Sep. 22, 2020    (KR) .................. 10-2020-0122538

(51) Int. Cl.
*G01C 21/36*    (2006.01)
*B60W 60/00*    (2020.01)

(52) U.S. Cl.
CPC ....... *G01C 21/3679* (2013.01); *B60W 60/001* (2020.02); *G01C 21/3617* (2013.01); *G01C 21/3626* (2013.01)

(58) Field of Classification Search
CPC ............ G01C 21/3679; G01C 21/3617; G01C 21/3626; B60W 60/001
See application file for complete search history.

(56) References Cited

U.S. PATENT DOCUMENTS

| | | | | |
|---|---|---|---|---|
| 10,692,371 B1* | 6/2020 | Nix | ............... | B60W 60/0021 |
| 11,010,998 B1* | 5/2021 | Dolgov | ............... | B60W 40/06 |
| 2015/0239477 A1* | 8/2015 | Kitagawa | ........... | G01C 21/3407 |
| | | | | 701/1 |
| 2016/0125662 A1* | 5/2016 | Fujita | ............... | G07B 15/02 |
| | | | | 705/13 |
| 2019/0012625 A1* | 1/2019 | Lawrenson | ............ | G07C 5/008 |
| 2019/0016188 A1* | 1/2019 | Hachisuka | ........... | B60G 17/016 |
| 2020/0082392 A1* | 3/2020 | Pishevar | ............... | G06Q 20/385 |
| 2020/0300019 A1* | 9/2020 | Dingli | ............... | E05F 15/431 |
| 2020/0385016 A1* | 12/2020 | Noguchi | ............ | B60W 60/001 |
| 2022/0176974 A1* | 6/2022 | Sanchez | ............ | G01C 21/3617 |

* cited by examiner

*Primary Examiner* — Anne Marie Antonucci
*Assistant Examiner* — Patrick M Brady
(74) *Attorney, Agent, or Firm* — Lempia Summerfield Katz LLC

(57) ABSTRACT

An apparatus for suggesting stopping by facilities includes a processor to suggest, as a stop, facilities, which are suitable for a user tendency or a user situation, of facilities positioned on a driving path of an autonomous vehicle, and a storage to store data and an algorithm executed by the processor. The processor provides, to a user, a list of the facilities suitable for the user tendency or the user situation, and adds facilities, which are selected by the user, to the stop on the driving path to guide to the driving path.

17 Claims, 7 Drawing Sheets

APPARATUS FOR SUGGESTING STOPPING BY FACILITIES AND AUTONOMOUS VEHICLE INCLUDING THE SAME

CROSS-REFERENCE TO RELATED APPLICATION

This application claims priority to and the benefit of Korean Patent Application No. 10-2020-0122538, filed on Sep. 22, 2020, the entire contents of which are incorporated herein by reference.

FIELD

The present disclosure relates to an apparatus for suggesting stopping by facilities and an autonomous vehicle including the same.

BACKGROUND

The statements in this section merely provide background information related to the present disclosure and may not constitute prior art.

An autonomous vehicle is a vehicle, which self-drives to a destination without the operation by a driver, refers to a vehicle having a technology of allowing the vehicle to self-drive by independently determining a road situation regardless of whether the driver gets in the vehicle.

In addition, there is popularized a path guide service that calculates the optimal path from a current position to a destination and provides calculated information in an audio form or an image form to a driver, when the driver inputs the destination. In other words, recently, a navigation device has been extensively used to search for a path from a departure to a destination, which is desired by a user, by using map data and to guide the user to the path.

Conventionally, in providing a path during autonomous driving, there is employed a technology of changing a path such that a vehicle stops by a stop only when a user inputs information on the stop, without suggesting, in advance, a path for stopping by facilities necessary for the user by determining the facilities in advance.

SUMMARY

The present disclosure has been made to solve the above-mentioned problems occurring in the prior art while advantages achieved by the prior art are maintained intact.

An aspect of the present disclosure provides an apparatus for suggesting stopping by facilities, capable of suggesting, in advance, stopping by facilities suitable for a user tendency or facilities necessary based on a user situation, during personal autonomous driving or the use of a shared vehicle in the middle of controlling autonomous driving, thereby increasing user convenience and improving the quality of a product, and an autonomous vehicle including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for suggesting stopping by facilities may include: a non-transitory memory configured to store data and a set of instructions executable to process a suggestion to stop an autonomous vehicle; and a processor configured to execute the set of instructions to: suggest a stop at a facility, which is suitable for tendency of a user or a situation of a user, among a plurality of facilities present on a driving path to a destination of an autonomous vehicle. The processor may provide, to the user, a list of other facilities suitable for the tendency of the user or the situation of the user, and may add facilities selected by the user to a list of stops corresponding to the selected facilities on the driving path to guide to the driving path.

According to an exemplary form, the processor may output a notification to a user terminal or an in-vehicle device when the driving vehicle enters within a first reference distance before arriving at the stop.

According to an exemplary form, the processor may determine whether the stop is a place providing Driving Through (DT).

According to another form, the processor may provide a guide to arrival at the stop, when the stop is not the place providing the DT and when the autonomous vehicle enters within a second distance shorter than the first reference distance before arriving at the stop.

According to an exemplary form, the processor may provide a guide to arrival at the stop, when the stop is the place providing the DT and when the autonomous vehicle enters within a second distance shorter than the first reference distance before arriving at the stop, and may control a window of the autonomous vehicle to be open.

According to an exemplary form, the process may inform of that the autonomous vehicle deviates from the stop, when the autonomous vehicle is beyond a third reference distance, which is shorter than the second reference distance from the stop, and may control the window of the autonomous vehicle to be closed.

According to an exemplary form, the processor may provide, to the in-vehicle device or the user device, one of a voice guide, a text guide, and a vibration notification, when providing the information, and may output the voice guide, the text guide, and the vibration notification by preset priorities.

According to one form, the processor may inform the list of the facilities, based on the information on facilities-as-stop setting, which is preset by the user.

According to another exemplary form, the processor may receive facilities-as-stop setting information while distinguishing between a personal autonomous vehicle and a shared autonomous vehicle.

According to another exemplary form, the processor may determine whether a plurality of driving paths are present, and determine whether the autonomous vehicle is a personal autonomous vehicle or a shared autonomous vehicle.

In one form, the processor may inform the list of the facilities positioned on the driving path, based on information on facilities-as-stop setting, which is determined by a majority decision, of information on facilities-as-stop setting of a plurality of users who use the shared autonomous vehicle, when the autonomous vehicle is the shared autonomous vehicle.

In another form, the processor may receive selections for stops, which are contained in the list of the facilities, from the plurality of users, and determine whether stops having the same brand name are present in the selected stops.

According to an exemplary form, the processor may add the selected stops to the driving path and perform a guide to the driving path, when the stops having the same brand are absent, and list up the selected stops by preset priorities and guide to the driving path, when the stops having the same brand name are present.

According to an exemplary form, the processor may preset the priorities based on at least one of a distance to the stop, a past use history of the user, a price, or a congestion degree.

According to an exemplary form, the processor may add a stop to the driving path and guide to the driving path, when a user, who wants to add the stop, requests for adding the stop in the shared autonomous vehicle, and when remaining users in the shared autonomous vehicle approve of adding the stop, and compensate the remaining users.

According to an exemplary form, the processor may compensate users, who do not approve of adding a stop, of remaining users of the shared autonomous driving, when a user, who wants to add the stop, requests for adding the stop in the shared autonomous vehicle, and when the stop is added by a majority decision.

According to an exemplary form, the processor may determine whether the user intakes food or beverage inside the autonomous vehicle, and suggest adding a public restroom or a rest area as the stop after a specific time is elapsed when the user intakes the food and the beverage.

According to an exemplary form, the processor may determine the user situation, based on image data of a camera inside the autonomous vehicle.

According to another aspect of the present disclosure, an apparatus for suggesting stopping by facilities may include a processor to add a stop, which is selected by a user, of facilities positioned on a driving path of an autonomous vehicle and guide to the driving path, and a storage to store data and an algorithm executed by the processor. The processor may list up a plurality of places by priorities preset based on the driving path when the selected stop includes the plurality of places, and add a place, which is selected by the user, of the plurality of places, to the stop and guide to the driving path.

According to another aspect of the present disclosure, an autonomous driving vehicle may include a via-facilities suggesting apparatus to suggest, as a stop, facilities, which are suitable for a user tendency or a user situation, of facilities positioned on a driving path of an autonomous vehicle, and a sensing device to sense the user situation. The via-facilities suggesting apparatus may provide, to a user, a list of the facilities suitable for the user tendency or the user situation and add facilities, which are selected by the user, to the stop on the driving path to guide to the driving path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
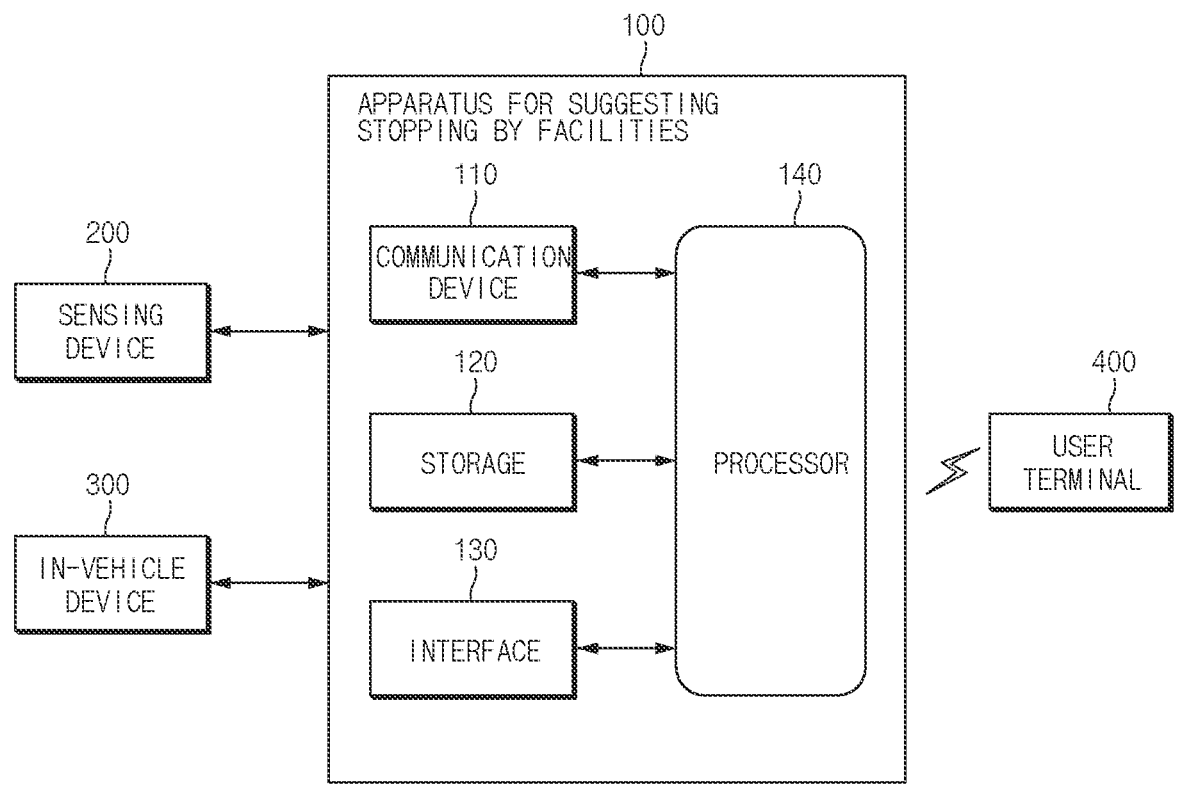
FIG. 1 is a block diagram illustrating a configuration of a vehicle system including an apparatus for suggesting stopping by facilities, according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of well-known features or functions will be ruled out in order not to unnecessarily obscure the gist of the present disclosure.

In addition, in the following description of components according to an exemplary form of the present disclosure, the terms 'first', 'second', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, forms of the present disclosure will be described with reference to FIGS. 1 to 7.

FIG. 1 is a block diagram illustrating a configuration of a vehicle system including an apparatus for suggesting stopping by facilities, according to an exemplary form of the present disclosure.

Referring to FIG. 1, the vehicle system may include an apparatus (hereinafter, referred to as a "via-facilities suggesting apparatus") 100 for suggesting stopping by facilities and a sensor device 200.

According to one form of the present disclosure, the via-facilities suggesting apparatus 100 may be implemented inside the vehicle. In this case, the via-facilities suggesting apparatus 100 may be implemented integrally with internal control units of the vehicle. Alternatively, the via-facilities suggesting apparatus 100 may be implemented separately from the internal control units of the vehicle and may be connected with the internal control units of the vehicle through an additional connection unit.

The via-facilities suggesting apparatus 100 may suggest, as a stop, facilities, which are suitable for a user tendency, of facilities positioned on a driving path of an autonomous vehicle. In other words, the via-facilities suggesting apparatus 100 may provide, to a user, a list of facilities suitable for the user tendency, and may add the facilities selected by the user to a stop positioned on the driving path and guide the user to the stop The via-facilities suggesting apparatus 100 may add, to a stop, facilities, which is selected by the user, of the facilities positioned on the driving path of the autonomous vehicle. When the selected stop includes a plurality of places, the via-facilities suggesting apparatus 100 may list up the plurality of places by priorities which are preset based on the driving path, may add a place, which is selected by the user from the plurality of places, to the stop, and may guide to the driving path.

The via-facilities suggesting apparatus 100 may detect, in advance, facilities necessary for the user situation during the driving of the autonomous vehicle and may add the facilities to the stop. In addition, the via-facilities suggesting apparatus 100 may determine whether a user intakes food or beverage inside the autonomous vehicle, and may suggest adding a public restroom or a rest area as the stop after a specific time is elapsed when the user intakes food and beverage Referring to FIG. 1, the via-facilities suggesting apparatus 100 may include a communication device 110, a storage 120, an interface 130, and a processor 140.

The communication device 110, which is a hardware device implemented with various electronic circuits to transmit or receive a signal through wireless or wired connection, and may make communication with an in-vehicle sensing device 200 or an in-vehicle device 300 based on an in-vehicle communication technology, and may make V2I communication through an in-vehicle network communication technology or, wireless Internet access or short range communication technology with an external server of a vehicle, an infrastructure, other vehicles, or a user terminal 400.

In this case, the user terminal 400 may include all mobile communication terminals having a display, and the mobile communication terminal includes a smartphone, a personal digital assistant (PDA), a portable multimedia player (PMP), a digital camera, a portable game console, an MP3 player, a smart key, and a tablet PC. The in-vehicle device 300 may include audio, video, navigation (AVN), telematics, and navigation.

In this case, the vehicle network communication technology may include a controller area network (CAN) communication technology, a local interconnect network (LIN) communication technology, a FlexRay communication technology, and in-vehicle communication may be performed through the above communication technology. In addition, the wireless Internet technology may include a wireless LAN (WLAN), a wireless broadband (Wibro), a Wi-Fi, World Interoperability for Microwave Access (Wimax). In addition, the short-range communication technology may include Bluetooth, ZigBee, ultra wideband (UWB), radio frequency identification (RFID), or infrared data association (IrDA).

For example, the communication device 110 may transmit/receive traffic information, road information, and information on facilities, by making wireless communication with other vehicles, traffic centers, and facilities. In this case, the traffic information may include traffic jam information, accident information, or the like, and the road information may include road construction information, and road detour information, or the like. The information on the facilities may include information on facilities closed, information on users of the facilities.

The storage 120 may store the sensing result of the sensing device 200 and data and/or algorithms necessary for the processor 140 to operate.

For example, the storage 120 may store information received through the communication device 110. In addition, the storage 120 may store a first reference distance, a second reference distance, and a third reference distance in advance for the notification of arrival at a stop.

The storage 120 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The interface 130 may include an input device to receive a control command from a user and an output device to output the operation state, the operation result, the notification, or the guide of the via-facilities suggesting apparatus 100. In this case, the input device may include a key button, and may include a mouse, a joystick, a jog shuttle, a stylus pen, or the like. In addition, the input device may include a soft key implemented on a display. The output device may include a display and may include a voice output device such as a speaker. When a touch sensor, such as a touch film, a touch sheet, or a touch pad, is included in the display, the display may operate as a touch screen, and the input device and the output device may be implemented in the integral form. According to the present disclosure, the output device may output a notification of arriving at a stop, an additional guide to the stop, a stop list, the list of facilities, information on selected facilities, an inquiry about a guide to the facilities, and a screen for suggesting stopping by the facilities. In addition, the input device may receive, from a user, an input related to the inquiry about the guide to the facilities or a suggestion of stopping by facilities.

In this case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The processor 140 may be electrically connected with the communication device 110, the storage 120, the interface 130, and the like, may electrically control each component, and may be an electric circuit that executes software commands. Accordingly, the processor 140 may perform various data processing and calculation, to be described below.

Accordingly, the processor 140 may process signals transmitted/received between components of the via-facilities suggesting apparatus 100. The processor 140 may be, for example, an electronic control unit (ECU), a micro controller unit (MCU), or another lower-level controller mounted in the vehicle.

The processor 140 may provide, to a user, a list of facilities, which are suitable for the user tendency, of facilities positioned on a driving path of the autonomous vehicle, and may add the facilities, which are selected by the user, to a stop positioned on the driving path and guide the user to the stop The processor 140 may output a notification to a user terminal or an in-vehicle device, when the vehicle enters within a first reference distance (e.g., 1 km) before arriving at the stop.

The processor 140 may determine whether the stop is a place providing Driving Through (DT).

The processor 140 may provide a guide to arrival at the stop, when the stop is not the place providing the DT and when the autonomous vehicle enters within a second distance shorter than the first reference distance before arriving at the stop.

The processor 140 may provide the guide to arrival at the stop, when the stop is the place providing the DT and when the autonomous vehicle enters within a second distance, which is shorter than the first reference distance, before arriving at the stop, and may control a window of the autonomous vehicle to be open.

The process 140 may inform that the autonomous driving deviates from the stop, when the autonomous vehicle is beyond a third reference distance (e.g., 100 m), which is shorter than the second reference distance, from the stop, and may control the window of the autonomous vehicle to be closed.

The processor 140 may provide, to the in-vehicle device or the user terminal, one of a voice guide, a text guide, or a vibration notification, when informing that the autonomous driving deviates from the stop, and may output the voice guide, the text guide, and the vibration notification by preset priorities.

The processor 140 may inform the list of the facilities, based on information on facilities-as-stop setting, which is preset by the user, in which the information on the facilities-as-stop setting information is information on setting of facilities as a stop.

The processor 140 may receive the facilities-as-stop setting while distinguishing between a personal autonomous vehicle and a shared autonomous vehicle.

The processor 140 may determine whether an autonomous vehicle is the personal autonomous vehicle or the shared autonomous vehicle, by determining whether a plurality of driving paths are provided.

The processor 140 may inform the list of facilities positioned on the driving path, based on the information on facilities-as-stop setting, which is determined by a majority decision, of information on facilities-as-stop setting of a plurality of users who use the shared autonomous vehicle.

The processor 140 may receive selections for stops, which are contained in the list of facilities, from the plurality of users, and may determine whether stops having the same brand name are present in the selected stops.

The processor 140 may add the selected stop to the driving path and may guide to the driving path, when the stops having the same brand name are absent.

When the stops having the same brand name are present, the processor 140 may list up the selected stops by preset priorities and may perform the path guide.

The processor 140 may receive the setting of at least one of a distance to the stop, a past use history of a user, a price, or a congestion degree by priorities, in advance.

When a user, who wants to add a stop, requests for adding the stop in the shared autonomous vehicle, and when remaining users in the shared autonomous vehicle approves of adding the stop, the processor 140 may add the stop, may perform a path guide, and may compensate the remaining users.

When a user, who wants to add a stop, requests for adding the stop in the shared autonomous vehicle, and when the stop is added by a majority decision, the processor 140 may compensate users, who do not approve of adding the stop, of remaining users in the shared autonomous driving.

The processor 140 may add a stop, which is selected by the user, of the facilities positioned on the driving path of the autonomous vehicle. When the selected stop includes a plurality of places, the processor 140 may list up the plurality of places positioned on the driving path by preset priorities, may add a place, which is selected by the user from the plurality of places, as the stop, and may perform the path guide.

The processor 140 may detect, in advance, facilities necessary for the user situation, based on image data of a camera inside the autonomous vehicle, during the driving of the autonomous vehicle and may suggest adding the detected facilities as a stop.

The processor 140 may determine whether a user intakes food or beverage in the autonomous vehicle and may suggest adding a public restroom or a rest area as the stop after a specific time is elapsed when the user intakes food and beverage.

The sensing device 200 may sense whether a user (occupant) intakes food or beverage in the vehicle. To this end the sensing device 200 may include an in-vehicle camera or a motion sensor.

Figure 2:
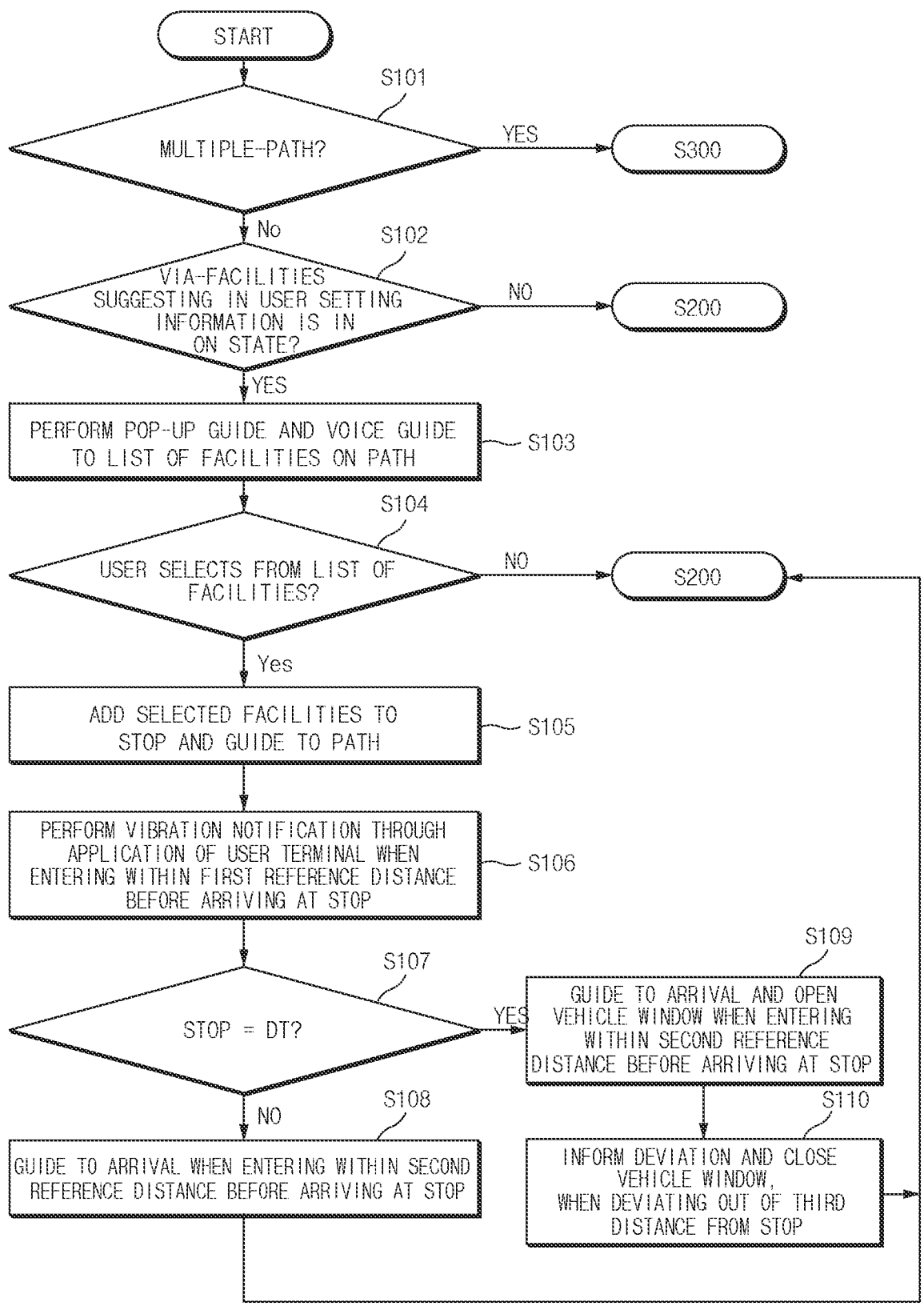
FIG. 2 is a flowchart illustrating a method for suggesting stopping by facilities in a personal autonomous vehicle, according to another form of the present disclosure.

Hereinafter, a method for suggesting stopping by facilities will be described in detail with reference to FIG. 2 according to another exemplary form of the present disclosure. FIG. 2 is a flowchart illustrating a method for suggesting stopping by facilities in a personal autonomous vehicle, according to an exemplary form of the present disclosure. Hereinafter, it is assumed that the via-facilities suggesting apparatus 100 of FIG. 1 performs the process of FIG. 2. In addition, in the description made with reference to FIG. 2, it may be understood that operations described as being performed by an apparatus are controlled by the processor 140 of the via-facilities suggesting apparatus 100.

Referring to FIG. 2, the via-facilities suggesting apparatus 100 determines whether a present path of the vehicle is a multiple-path (S101). In this case, the via-facilities suggesting apparatus 100 may determine a host autonomous vehicle as being a shared autonomous vehicle when the present path is the multiple-path. When the present path is a single path, the via-facilities suggesting apparatus 100 may determine the host autonomous vehicle as a personal autonomous vehicle. In this case, in the personal autonomous vehicle, at least one or two occupants are present.

Figure 6:
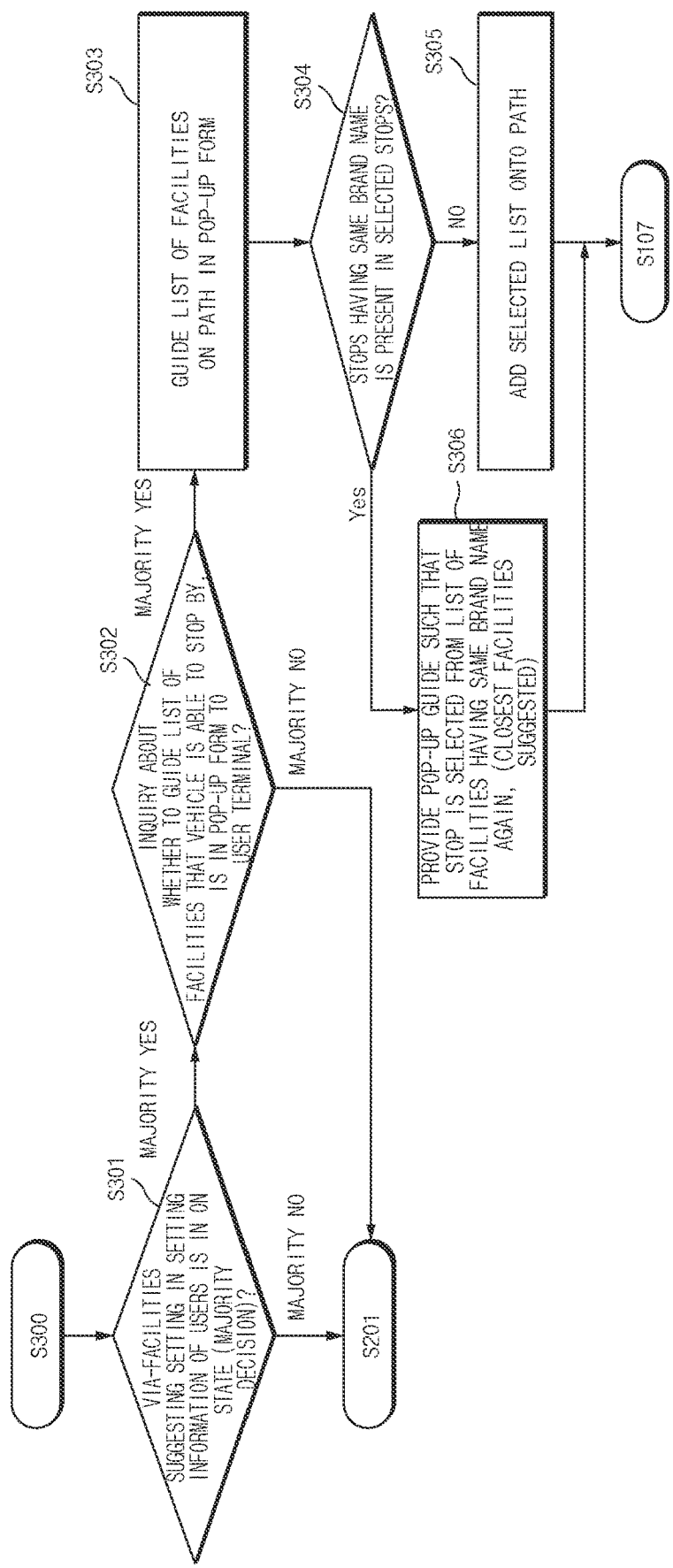
FIG. 6 is a flowchart illustrating a method for suggesting stopping by facilities in a shared autonomous vehicle, according to another form of the present disclosure.

In S101, when the present path is the multiple-path, S300 of FIG. 6 is performed thereafter.

Figure 3:
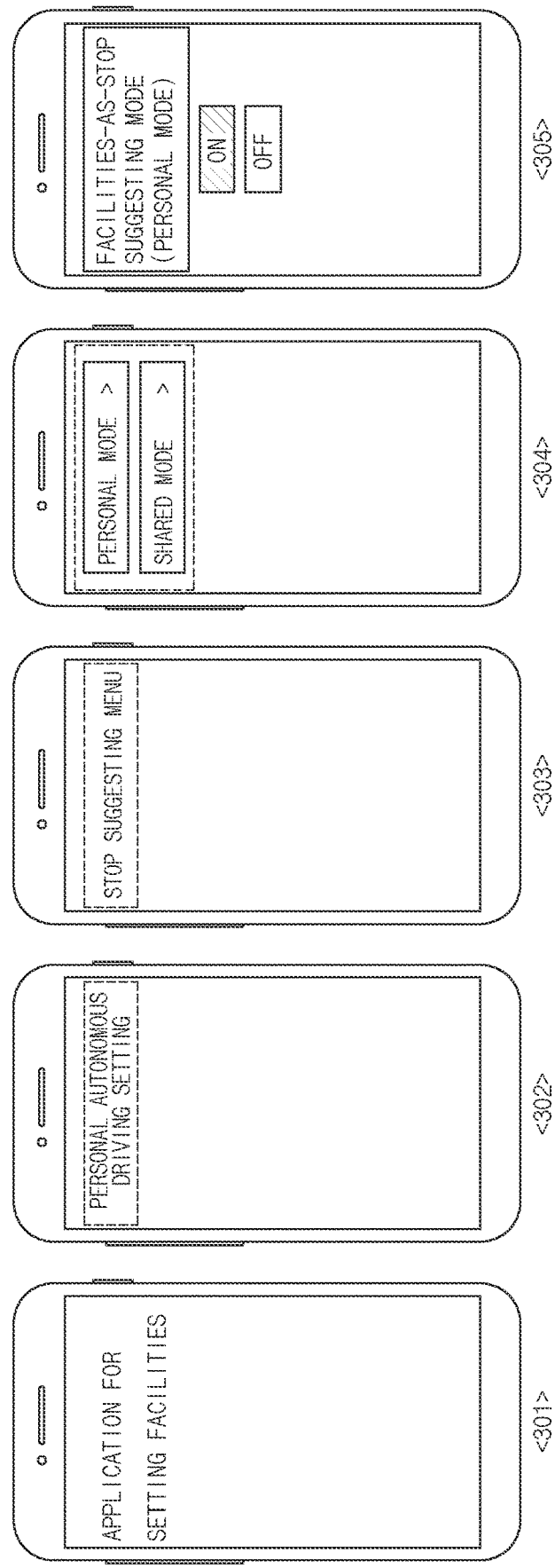
FIG. 3 is a view illustrating a screen for via-facilities setting on a user terminal in a personal autonomous vehicle, according to some forms of the present disclosure.

When the present path is not the multiple-path, that is, when the host autonomous vehicle is the personal autonomous vehicle, the via-facilities suggesting apparatus 100 determines whether via-facilities suggesting setting contained in occupant settings is in an On state. FIG. 3 is a view illustrating a screen for via-facilities setting on a user terminal in a personal autonomous vehicle, according to an exemplary form of the present disclosure. When an application installed in a user terminal as illustrated in reference numeral 301 of FIG. 3 is executed, a personal autonomous driving setting menu is displayed as illustrated in reference numeral 302, and a stop suggesting menu is displayed as illustrated in reference numeral 303 when the personal autonomous driving setting menu is selected. Thereafter, when the stop suggesting menu is selected, a personal mode and a shared mode are separately displayed as illustrated in reference numeral 304. When the personal mode is selected, and when an ON state is set in a facilities-as-stop suggesting mode as illustrated in reference numeral 305

Although FIG. 3 illustrates that via-facilities suggesting setting is performed using a user terminal, the via-facilities suggesting setting is enabled through the in-vehicle device, in the case of the persona autonomous driving vehicle.

Figure 5:
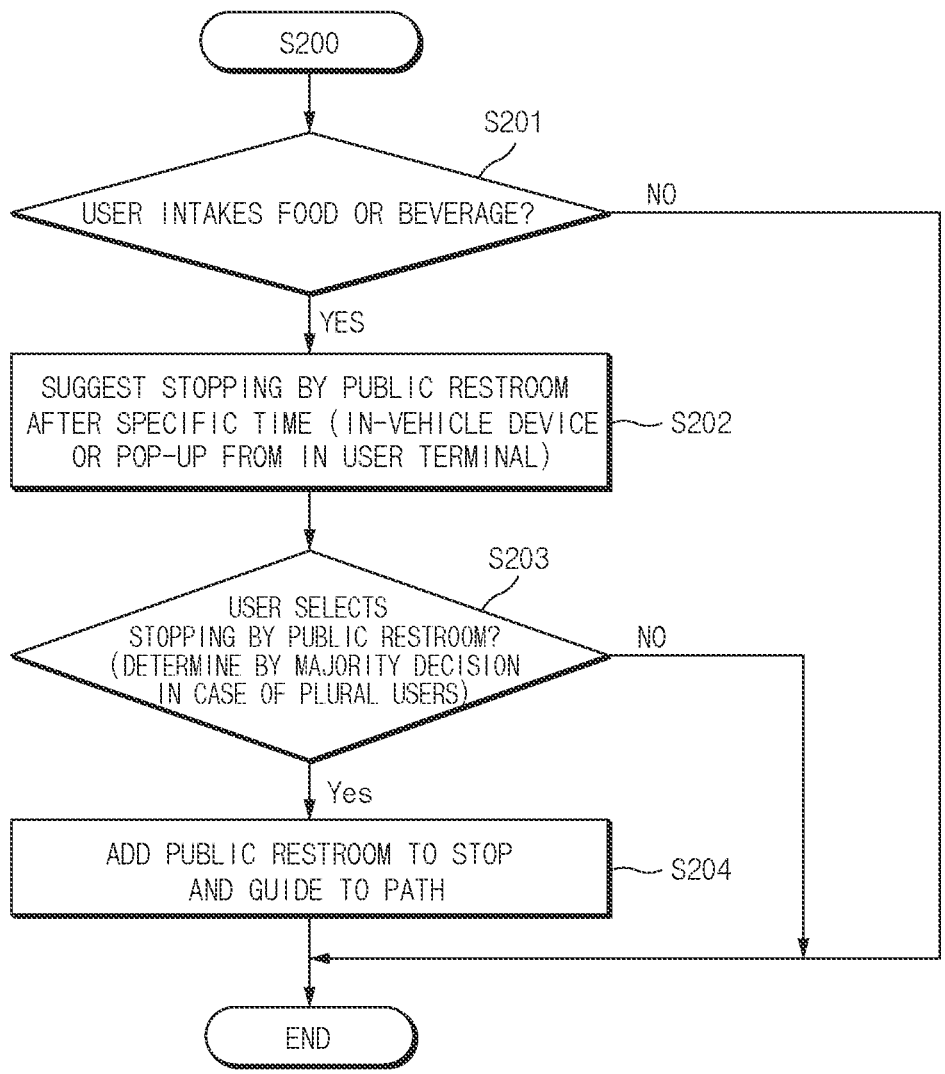
FIG. 5 is a flowchart illustrating a method for suggesting, in advance, stopping by facilities depending on a user situation, according to an exemplary form of the present disclosure.

Meanwhile, when the via-facilities suggesting setting is in an OFF state, a path guide to a destination is provided without suggesting a stop, and S200 of FIG. 5 is performed thereafter.

When the via-facilities suggesting setting is in an ON state, the via-facilities suggesting apparatus 100 informs the list of facilities, which are positioned on the path, in a pop-up form, and outputs the voice guide (S103). In this case, the via-facilities suggesting apparatus 100 may information the list of facilities through the in-vehicle device 300 or the user terminal 400.

In this case, the list of facilities may be formed by prioritizing facilities based on distances, fit degrees, prices, congestion degrees, and visit counts (past use histories). The via-facilities suggesting apparatus 100 may form the list of facilities by priorities preset by the user. In particular, the via-facilities suggesting apparatus 100 may display places frequently visited by the user with the highest priority, based on a database in the case of the personal autonomous vehicle. For example, when the via-facilities suggesting apparatus 100 suggests a café, and when there is present a history that the user frequently visited to Starbucks in the past, the via-facilities suggesting apparatus 100 may suggest Starbucks with the highest priority. In addition, the list of facilities may be provided in a manner set by the user, that is, to the in-vehicle device or the user terminal.

In addition, the via-facilities suggesting apparatus 100 may provide a notification through the user terminal 400 after providing a voice guide in the autonomous vehicle, when setting the voice guide to have the highest priority.

As described above, the via-facilities suggesting apparatus 100 may perform the via-facilities suggesting setting by distinguishing between the personal autonomous vehicle and the shared autonomous vehicle. For example, although the user want to stop by a DT café when using the vehicle alone or with a friend, the user does not want to stop by a DT café when gets in the shared autonomous vehicle with a stranger. As described above, the via-facilities suggesting apparatus 100 may provide different via-facilities suggesting settings for the personal autonomous vehicle and the shared autonomous vehicle, and may regard a setting value as being for the personal mode when the user gests in the shared autonomous vehicle alone. In addition, the via-facilities suggesting apparatus 100 may suggest facilities in limitation to facilities, such as a DT store, or a convenience store, which allow occupants to receive food in the vehicle or to finish urgent businesses within a short time, because many unspecified people, which do not know each other, commonly the shared autonomous vehicle, in the case of the shared autonomous vehicle having multiple paths.

Thereafter, the via-facilities suggesting apparatus 100 may determine whether a user (an occupant) selects facilities from the informed list of facilities (S104). When the facilities are selected from the list of facilities by the user, the selected facilities are added to as a stop and a path guide may be performed (S105) Meanwhile, when the facilities are not selected from the list of facilities by the user, the path guide to the destination is provided without suggesting the stop, and S200 of FIG. 5 is performed thereafter.

The via-facilities suggesting apparatus 100 notifies that the vehicle approaches the stop, through the application of the user terminal 400, when the vehicle enters within the first reference distance (e.g., 1 km), which is preset, before arriving at the stop (S106). In other words, the via-facilities suggesting apparatus 100 may allow the user to recognize, in advance, that the vehicle almost arrives at the stop, by providing, in advance, a notification to user before arriving at the stop, when the user sleeps or takes a rest in the autonomous vehicle.

Thereafter, the via-facilities suggesting apparatus 100 determines whether the stop is a place allowing DT (S107). When the stop is not the place allowing DT, the via-facilities suggesting apparatus 100 provides a guide to the arrival at the stop when the vehicle enters within the second reference distance (e.g., 300 m) before arriving at the stop (S108). Meanwhile, when the stop is the place allowing DT, the via-facilities suggesting apparatus 100 provides information on arrival and performs the opening of the vehicle window when the vehicle enters within the second distance (e.g., 300 m) before arriving at the stop (S109), such that the user receives food or beverage through the open window. Thereafter, the via-facilities suggesting apparatus 100 informs the deviation from the stop and controls the vehicle window to be closed, when the vehicle moves to be out of the preset third distance (e.g., 100 m) from the stop (S110). For example, the via-facilities suggesting apparatus 100 may control the vehicle window to be closed two seconds after the voice guide of "the window is closed"

In this case, the via-facilities suggesting apparatus 100 may be set by the user regarding whether to provide the voice guide through the in-vehicle device or to provide an alarm through the user terminal, depending on the shared autonomous vehicle or the personal autonomous vehicle. The voice guide through the in-vehicle device and the alarm through the user terminal may be provided by priorities set therefor. However, the via-facilities suggesting apparatus 100 may set the voice guide in default in the shared autonomous vehicle, and all occupants may set the alarm provided through the user terminal to have the highest priority, which may be informed by the alarm through the user terminal.

Figure 4:
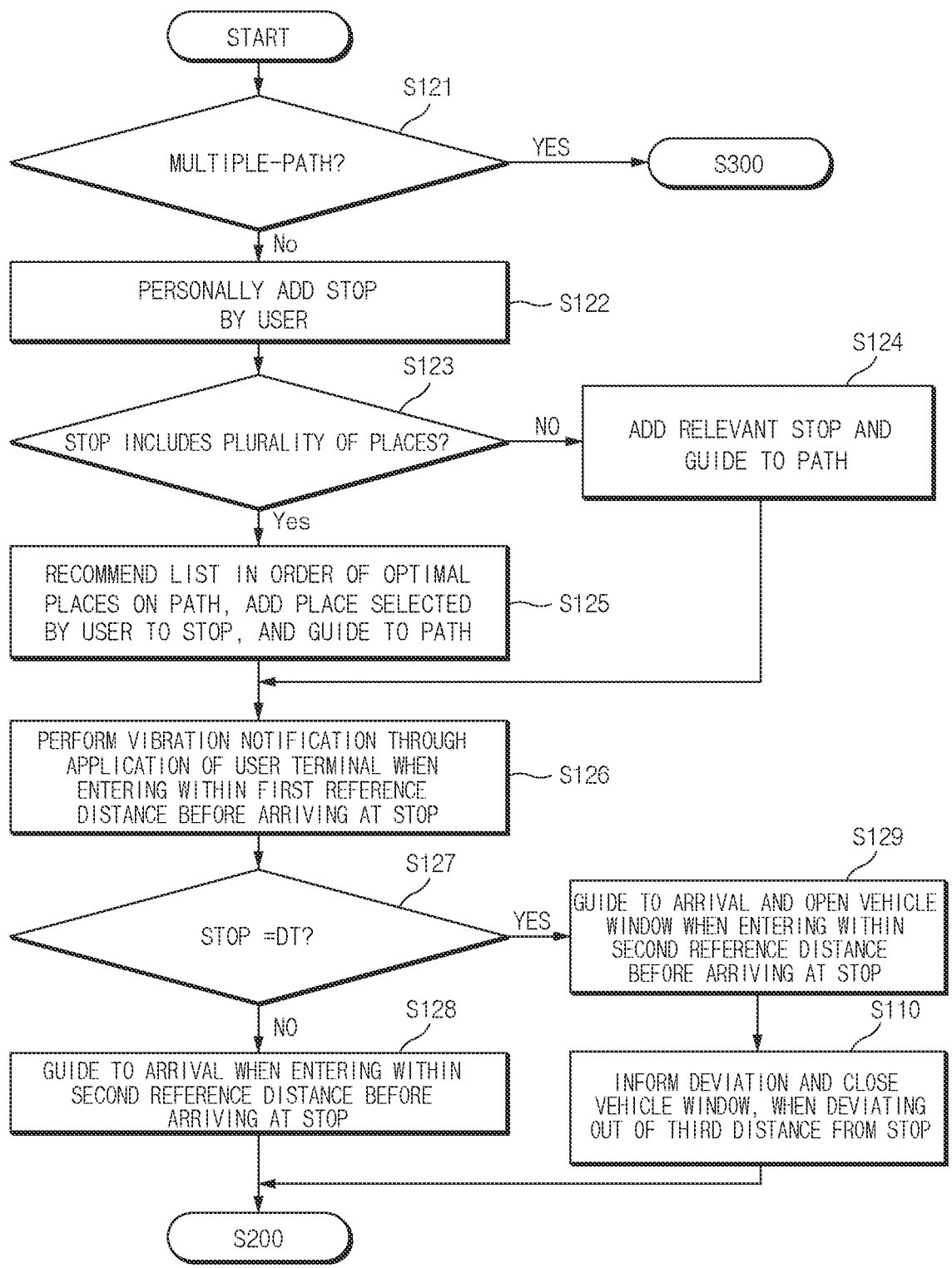
FIG. 4 is a flowchart illustrating a method for suggesting stopping by facilities, according to another form of the present disclosure.

Hereinafter, a method for suggesting stopping by facilities in the personal autonomous vehicle will be described in detail with reference to FIG. 4 according to another form of the present disclosure. FIG. 4 is a flowchart illustrating a method for suggesting stopping by facilities in the personal autonomous vehicle, according to another form of the present disclosure. Hereinafter, it is assumed that the via-facilities suggesting apparatus 100 of FIG. 1 performs the process of FIG. 4. In addition, in the description made with reference to FIG. 4, it may be understood that operations described as being performed by an apparatus are controlled by the processor 140 of the via-facilities suggesting apparatus 100.

Referring to FIG. 4, the via-facilities suggesting apparatus 100 determines whether a present path of the vehicle is a multiple-path (S121). In this case, the via-facilities suggesting apparatus 100 may determine a host autonomous vehicle as being a shared autonomous vehicle when the multiple-path is present. When the present path is a single path, the via-facilities suggesting apparatus 100 may determine the host autonomous vehicle as a personal autonomous vehicle. In this case, at least one or two occupants are present in the personal autonomous vehicle.

In S121, when the present path is the multiple-path, S300 of FIG. 6 is performed thereafter. When the present path is not the multiple-path, that is, when the host autonomous vehicle is the personal autonomous vehicle, the via-facilities suggesting apparatus 100 may directly receive an additional stop from the user (S122).

In this case, the via-facilities suggesting apparatus 100 determines whether the input stop is a specific single store, or a franchise having a plurality of places (S123).

When the input stop is the specific single place, the via-facilities suggesting apparatus 100 adds the stop and performs the path guide (S124).

Meanwhile, when input stops are the plurality of places, the via-facilities suggesting apparatus 100 recommends the list of facilities in order of the optimal places positioned on the path, adds a place, which is selected by the user from the recommended list of facilities, as a stop, and performs the path guide (S125). In this case, the via-facilities suggesting apparatus 100 may form the list of the facilities by preset priorities based on distances, prices, congestion degrees, or the past use history and may perform the path guide.

Thereafter, S126 to S130 are the same S106 to S110 of FIG. 2, so the details thereof will be omitted.

Hereinafter, a method for suggesting, in advance, stopping by facilities depending on a user situation will be described in detail with reference to FIG. 5. FIG. 5 is a flowchart illustrating a method for suggesting stopping by facilities depending on the situation of a user, according to an exemplary form of the present disclosure. Hereinafter, it is assumed that via-facilities suggesting apparatus 100 of FIG. 1 performs the process of FIG. 5. In addition, in the description made with reference to FIG. 5, it may be understood that operations described as being performed by an apparatus are controlled by the processor 140 of the via-facilities suggesting apparatus 100.

Referring to FIG. 5, the via-facilities suggesting apparatus 100 determines whether a user intakes food or beverage (S201). The via-facilities suggesting apparatus 100 may determine whether the user intakes the food or the beverage through the sensing device 200, especially, the camera in the autonomous vehicle.

When it is determined that the user intakes the food or the beverage, the via-facilities suggesting apparatus 100 may suggest stopping by a restroom after a specific time (e.g., 30 minutes) is elapsed. In this case, the via-facilities suggesting apparatus 100 may output, to the in-vehicle device 300 or the user terminal 400, a wording or a voice for suggesting stopping by the restroom (rest area) in a pop-up form.

Accordingly, the via-facilities suggesting apparatus 100 determines whether stopping by the restroom (rest area) is selected by the user (S203). In this case, when a plurality of users are present, stopping by the restroom is selected through a majority decision.

When stopping by the restroom (rest area) is selected by a single user or by at least two users, the via-facilities suggesting apparatus 100 performs the path guide by adding the restroom as the stop (S204).

Hereinafter, a method for suggesting suggests stopping by facilities in the shared autonomous vehicle will be described in detail with reference to FIG. 6 according to another form of the present disclosure. FIG. 6 is a flowchart illustrating a method for suggesting stopping by facilities in the shared autonomous vehicle, according to another form of the present disclosure. Hereinafter, it is assumed that the via-facilities suggesting apparatus 100 of FIG. 1 performs the process of FIG. 6. In addition, in the description made with reference to FIG. 6, it may be understood that operations described as being performed by an apparatus are controlled by the processor 140 of the via-facilities suggesting apparatus 100.

Referring to FIG. 6, the via-facilities suggesting apparatus 100 determines whether the via-facilities suggesting setting is in an On state, by determining the setting information of users, in the shared autonomous vehicle used by at least two users (S301). In this case, when a plurality of users are present, the On/Off state of the via-facilities suggesting setting may be determined by a majority decision.

When the via-facilities suggesting setting is determined as being in the Off state by the majority decision, the via-facilities suggesting apparatus 100 provides a path guide to a destination without suggesting a stop, and performs S200 of FIG. 5.

When the via-facilities suggesting setting is determined to be in the On state by the majority decision, the via-facilities suggesting apparatus 100 outputs an inquiry about whether to guide the list of facilities that the vehicle is able to stop by, in a pop-up form to the user terminal, receives, from the user, a response to the inquiry about whether to guide to the list of the facilities, and determines whether to guide to the list of facilities, by the majority decision (S302).

When many users do not select the guide to the list of the facilities, the via-facilities suggesting apparatus 100 provides the path guide to the destination without suggesting the stop and performs S200 of FIG. 5 thereafter.

When many users select the guide to the list of the facilities, the via-facilities suggesting apparatus 100 guides the list of the facilities in a pop-up form (S303). Accordingly, the via-facilities suggesting apparatus 100 receives a selection for at least one stop from the list of facilities from the users and determines whether stops having the same brand name are present in selected stops (S304).

The via-facilities suggesting apparatus 100 may add the selected stop to a path and may guide to the path, when the stops having the same brand name are absent in the selected stops (S305).

The via-facilities suggesting apparatus 100 provides a guide in a pop-up form such that a stop is selected from a list of facilities having the same brand name again, when stops having the same brand name are present with respect to the selected stops (S306). In this case, when the stops having the same brand name are present in the selected stops, the via-facilities suggesting apparatus 100 re-organizes the list of the facilities by priorities of distances, prices, and congestion degrees, and performs the path guide.

When a plurality of stops are present, the via-facilities suggesting apparatus 100 adds the plurality of stops, sets a final path, and asks users for the consent to the stops in the pop-up form on user terminals.

In addition, when a user, who wants to add a stop, requests for adding the stop in the shared autonomous vehicle, and when more than half of the remaining users approve of the addition of the stop, the via-facilities suggesting apparatus 100 may add the stop to the path and guide to the path.

In addition, when the addition of the stop is approved, the via-facilities suggesting apparatus 100 may allow the user, who adds the stop, to distribute the rewards of the user to other users having approved of the addition of the stop to compensate the other users for inconvenience.

As described above, in the case of the shared autonomous vehicle, stopping by is determined by a majority decision of users using the vehicle, and users, who do not want to stop by but approve of the addition of the stop, may receive double rewards useful like cash, and may be compensated with a discount rate.

As described above, the stop is suggested on the driving path by detecting the tendency of the user, or whether the user intakes food or beverage is detected by using the camera installed in the vehicle such that the stop necessary for the user is suggested in advance, thereby improve user convenience.

Figure 7:
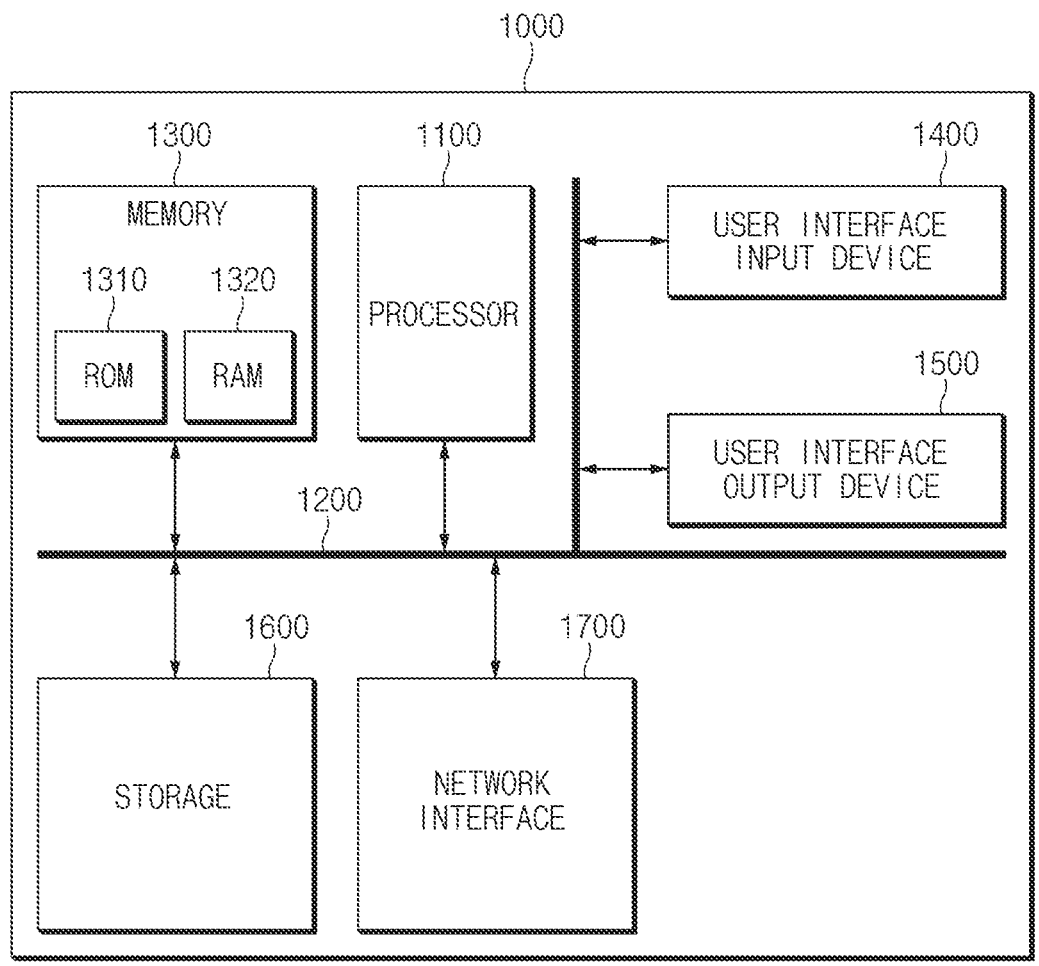
FIG. 7 illustrates a computing system, according to an exemplary form of the present disclosure.

FIG. 7 illustrates a computing system, according to an exemplary form of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, forms of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

As described above, according to the present disclosure, stopping by facilities suitable for a user tendency or facilities necessary based on a user situation may be suggested, in advance, during personal autonomous driving or the use of a shared vehicle in the middle of controlling autonomous driving, thereby increasing user convenience and improving the quality of a product.

Besides, a variety of effects directly or indirectly understood through the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. An apparatus comprising:
a non-transitory memory configured to store data and a set of instructions executable to process a suggestion to stop an autonomous vehicle;
a camera disposed inside the autonomous vehicle and configured to capture images during a driving of the autonomous vehicle; and
a processor configured to execute the set of instructions to:
determine whether the autonomous vehicle is a personal autonomous vehicle or a shared autonomous vehicle by determining whether a plurality of driving paths are present;
suggest a stop at a facility, among a plurality of facilities positioned on a driving path to a destination of the autonomous vehicle, based on a tendency or a situation of a user of the autonomous vehicle, by determining whether the autonomous vehicle is the personal autonomous vehicle or the shared autonomous vehicle, wherein the situation of the user is determined based on the images captured by the camera;
provide, to the user for user selection, a list of other facilities to stop, among the plurality of facilities, based on the tendency or the situation of the user; and
add selected facilities to a list of stops corresponding to the selected facilities on the driving path,
wherein the processor is configured to:
when the autonomous vehicle is the shared autonomous vehicle, provide a list of stops corresponding to facilities determined based a majority decision of a plurality of users who use the shared autonomous vehicle at the same time.

2. The apparatus of claim 1, wherein the processor is further configured to:
output a notification to a user terminal or an in-vehicle device when the autonomous vehicle enters within a first reference distance before arriving at the suggested stop corresponding to the facility.

3. The apparatus of claim 2, wherein the processor is configured to:
determine whether the suggested stop is a place providing a Driving Through (DT).

4. The apparatus of claim 3, wherein the processor is configured to:
provide a guide to arrive at the suggested stop, when the suggested stop is not the place providing the DT and when the autonomous vehicle enters within a second distance, which is shorter than the first reference distance, before arriving at the suggested stop.

5. The apparatus of claim 3, wherein the processor is configured to:
provide a guide to arrive at the suggested stop, when the suggested stop is the place providing the DT and when the autonomous vehicle enters within a second reference distance, which is shorter than the first reference distance, before arriving at the suggested stop; and
control a window of the autonomous vehicle to be open.

6. The apparatus of claim 5, wherein the process is configured to:
inform that the autonomous vehicle deviates from the suggested stop, when the autonomous vehicle is beyond a third reference distance, which is shorter than the second reference distance from the suggested stop; and
control the window of the autonomous vehicle to be closed.

7. The apparatus of claim 6, wherein the processor is configured to:
provide, to the in-vehicle device or a user device, at least one of a voice guide, a text guide, or a vibration notification, when informing that the autonomous vehicle deviates from the suggested stop; and
output the at least one of the voice guide, the text guide, or the vibration notification based on preset priorities.

8. The apparatus of claim 1, wherein the processor is configured to:
add facilities preset by the user to the list of stops.

9. The apparatus of claim 8, wherein the processor is configured to:
separate facilities of the plurality of facilities based on a type of the autonomous vehicle, wherein the type of the autonomous vehicle includes a personal autonomous vehicle and a shared autonomous vehicle.

10. The apparatus of claim 1, wherein the processor is configured to:
receive selections for stops, which are contained in the list of stops corresponding to the facilities determined by the majority decision; and
determine whether stops having the same brand name are present in the selected stops.

11. The apparatus of claim 10, wherein the processor is configured to:
add the selected stops to the driving path and perform a guide to the driving path, when the stops having the same brand are absent; and
list up the selected stops by preset priorities and guide to the driving path, when the stops having the same brand name are present.

12. The apparatus of claim 11, wherein the processor is configured to:
preset the priorities based on at least one of a distance to the stop, a past use history of the user, a price, or a congestion degree.

13. The apparatus of claim 1, wherein the processor is configured to:
add a stop to the driving path and guide to the driving path, when a user, who wants to add the stop, requests for adding the stop in the shared autonomous vehicle, and when remaining users in the shared autonomous vehicle approve of adding the stop; and
compensate the remaining users.

14. The apparatus of claim 1, wherein the processor is configured to:
compensate users, who do not approve of adding a stop, of remaining users of the shared autonomous vehicle, when a user, who wants to add the stop, requests for adding the stop in the shared autonomous vehicle, and when the stop is added by a majority decision.

15. The apparatus of claim 1, wherein the processor is configured to:
determine whether the user intakes food or beverage inside the autonomous vehicle; and
suggest adding a public restroom or a rest area as the stop after a specific time is elapsed when the user intakes the food and the beverage.

16. An apparatus for suggesting stopping by facilities, the apparatus comprising:
a processor configured to add a stop, which is selected by a user, of facilities positioned on a driving path of an autonomous vehicle and guide to the driving path; and
a non-transitory memory configured to store data and a set of instructions executed by the processor,
wherein the processor is further configured to:
list up a plurality of places by priorities preset based on the driving path when the selected stop includes the plurality of places;
add another place, which is selected by the user among the plurality of places, to the stop and guide to the driving path;
determine whether the autonomous vehicle is a personal autonomous vehicle or a shared autonomous vehicle by determining whether a plurality of driving paths are present; and
suggest a stop at a facility, among a plurality of facilities positioned on a driving path to a destination of the autonomous vehicle, based on a tendency or a situation of a user of the autonomous vehicle, by determining whether the autonomous vehicle is the personal autonomous vehicle or the shared autonomous vehicle, wherein the situation of the user is determined based on images captured by a camera disposed inside the autonomous vehicle and configured to capture the images during a driving of the autonomous vehicle,
wherein the processor is further configured to:
when the autonomous vehicle is the shared autonomous vehicle, provide a list of stops corresponding to facilities determined based a majority decision of a plurality of users who use the shared autonomous vehicle at the same time.

17. An autonomous driving vehicle comprising:
a via-facilities suggesting apparatus, comprising a processor configured to suggest, as a stop, facilities, which are suitable for a user tendency or a user situation, of facilities positioned on a driving path of an autonomous vehicle, by determining whether the autonomous vehicle is a personal autonomous vehicle or a shared autonomous vehicle, wherein the user situation is determined based on images captured by a camera; and
the camera configured to sense the user situation by capturing the images during a driving of the autonomous driving vehicle,
wherein the processor of the via-facilities suggesting apparatus is configured to:
provide, to a user, a list of the facilities suitable for the user tendency or the user situation;
add facilities, which are selected by the user, to the stop on the driving path to guide to the driving path; and
determine whether the autonomous vehicle is the personal autonomous vehicle or the shared autonomous vehicle by determining whether a plurality of driving paths are present,
wherein the processor is configured to:
when the autonomous vehicle is the shared autonomous vehicle, provide a list of stops corresponding to facilities determined based a majority decision of a plurality of users who use the shared autonomous vehicle at the same time.

* * * * *